United States Patent [19]
Whitacre

[11] Patent Number: 5,979,298
[45] Date of Patent: Nov. 9, 1999

[54] COOLING GALLERY FOR PISTONS

[75] Inventor: John P. Whitacre, New Haven, Ind.

[73] Assignee: Zellner Pistons, LLC, Fort Wayne, Ind.

[21] Appl. No.: 09/040,716

[22] Filed: Mar. 18, 1998

Related U.S. Application Data

[60] Provisional application No. 60/045,993, May 8, 1997.

[51] Int. Cl.$^6$ ......................................................... F16J 1/04
[52] U.S. Cl. ................................ 92/211; 92/227; 92/228;
123/193.6; 29/888.047; 29/888.048
[58] Field of Search .............................. 92/186, 208, 211,
92/222, 224, 227, 228; 123/193.6; 29/888.04,
888.047, 888.048

[56] References Cited

U.S. PATENT DOCUMENTS

| | | |
|---|---|---|
| 1,759,509 | 5/1930 | Jardine . |
| 2,473,254 | 1/1949 | Morris . |
| 2,685,729 | 8/1954 | Daub . |
| 3,991,811 | 11/1976 | Diez et al. . |
| 4,026,197 | 5/1977 | Lapke et al. ................................ 92/186 |
| 4,083,292 | 4/1978 | Goloff .................................... 92/186 X |
| 4,120,081 | 10/1978 | Rösch et al. . |
| 4,494,501 | 1/1985 | Ludovico . |
| 4,586,553 | 5/1986 | Allen et al. . |
| 4,658,706 | 4/1987 | Sander et al. . |
| 4,662,326 | 5/1987 | Köhnert . |
| 4,776,075 | 10/1988 | Kawabata et al. . |
| 4,833,977 | 5/1989 | Haahtela et al. ....................... 92/222 X |
| 4,890,543 | 1/1990 | Kudou et al. . |
| 4,971,003 | 11/1990 | Suzuki et al. . |
| 5,425,306 | 6/1995 | Binford . |
| 5,505,171 | 4/1996 | Gazzard ................................. 92/222 X |
| 5,660,156 | 8/1997 | Whitacre . |

FOREIGN PATENT DOCUMENTS

| | | |
|---|---|---|
| 0 775 542 A1 | 5/1997 | European Pat. Off. . |
| 10 97 210 | 1/1963 | Germany . |
| 62-249869 | 5/1987 | Japan . |
| 2 090 780 | 7/1982 | United Kingdom . |

OTHER PUBLICATIONS

Article entitled "The development of the Hollow Ring Groove Insert Piston and its Production Technology" by Tatsya Suzuki, Hideo Negishi, Hitoshi Takanashi, and Hideki Otaka of Hino Motors, Ltd., and Masahiro Morita of Izumi Industries, Ltd. No date.

*Primary Examiner*—Hoang Nguyen
*Attorney, Agent, or Firm*—Barnes & Thornburg

[57] ABSTRACT

A cast piston having a metal insert that includes a cooling gallery and defines a piston ring groove. The piston insert includes an annular base having an annular cavity formed therein and an annular ring which extends radially outward from the base. A cast piston is fabricated by positioning the piston insert in a piston mold and casting a piston. After the piston is cast, the piston groove ring is machined in a portion of the annular ring and at least one channel is formed between the annular cavity and a bottom portion of the piston. In use, a cooling fluid is directed through the at least one channel and into the annular cavity.

24 Claims, 2 Drawing Sheets

5,979,298

COOLING GALLERY FOR PISTONS

RELATED APPLICATION

This application is based upon United States Provisional Application Ser. No. 60/045,993, filed May 8, 1997, the complete disclosure of which is hereby expressly incorporated by reference.

TECHNICAL FIELD

The present invention relates to pistons for internal combustion engines. More particularly, the present invention is directed to cast pistons which include imbedded inserts which define cooling galleries within the pistons.

BACKGROUND ART

Pistons used in internal combustion engines, and particularly in medium range diesel engines, are generally of one of three designs: gravity cast aluminum pistons, squeeze-formed aluminum/metal matrix composite pistons, and two-piece steel crown/aluminum skirt articulated pistons. There are fairly well defined levels of specific power output which each of these design options can tolerate. Cost varies greatly between the three designs, with gravity cast pistons being the most economical to manufacture.

Pistons encounter extreme thermal conditions and mechanical forces which together subject certain portions of the pistons to stress that can lead to deterioration and failure. To date, efforts have been taken to reinforce and/or thermally insulate and/or cool portions of cast pistons so that they are more durable and have a longer service life. Such efforts include the design of a variety of insert structures which provide thermal barriers and/or internal structural supports. Examples of insert structures used in cast pistons are found in U.S. Pat. No. 5,425,306 to Binford, U.S. Pat. No. 4,971,003 to Suzuki et al., U.S. Pat. No. 4,890,543 to Kudou et al., U.S. Pat. No. 4,662,326 to Kohnert, U.S. Pat. No. 4,658,706 to Sander et al., U.S. Pat. No. 4,494,501 to Ludovico, U.S. Pat. No. 4,120,081 to Rosch et al., U.S. Pat. No. 2,685,729 to Daub, U.S. Pat. No. 2,473,254 to Morris, and U.S. Pat. No. 1,759,509 to Jardine.

In addition to structural supporting inserts of various designs, cooling channels or galleries through which cooling oil is caused to flow have been included in some piston head designs. For example, U.S. Pat. No. 4,776,075 to Kawabata et al., U.S. Pat. No. 4,586,553 to Allen et al., and U.S. Pat. No. 3,991,811 to Dies, et al. each disclose piston designs which include annular shaped cooling galleries.

The present invention is directed to a cooling gallery insert design which provides both mechanical strength and the ability to cool a piston head.

DISCLOSURE OF THE INVENTION

In accordance with other features and characteristics of the present invention which will become apparent as the description thereof proceeds, the present invention provides a cast piston which includes:

a piston head having an upper crown surface and a peripheral side surface;

a piston skirt extending downward from the piston head; and an annular metal insert provided in the piston head below the upper crown surface and intersecting the peripheral side surface, the annular metal insert comprising a base and an annular ring that are integrated together to form a unitary structure, the base having an annular shaped passageway therein, and the annular ring extending radially outward from the base.

The present invention also provides a cast piston which includes:

a piston head having an upper crown surface and a peripheral side surface;

a piston skirt extending downward from the piston head; and an annular metal insert provided in the piston head below the upper crown surface and intersecting the peripheral side surface, the annular metal insert comprising:
a base having an annular cavity defined therein, and
an annular ring extending radially outward from the base.

The present invention further provides a method of fabricating a cast piston which involves:

providing a piston mold;

positioning a metal insert having an annular cavity in the piston mold, the metal insert having an annular cavity;

casting a piston in the piston mold so that the metal insert is beneath a crown surface of the cast piston;

machining a piston ring groove in a portion of the metal insert; and boring at least one channel in the cast piston which at least one channel communicates between the annular cavity of the metal insert and a bottom portion of the cast piston.

BRIEF DESCRIPTION OF DRAWINGS

The present invention will be described hereafter with reference to the attached drawings which are given as non-limiting examples only, in which.

BEST MODE FOR CARRYING OUT THE INVENTION

The present invention is directed to cast pistons for internal combustion engines. More particularly, the present invention is directed to cast aluminum pistons which can be made utilizing either a pressure casting process or, more preferably, a gravity casting process. The cast pistons of the present invention include an inserts that are beneath the crown surface of the pistons and intersect the upper peripheral sides of the pistons.

The inserts of the present invention provide mechanical strength to the piston heads and are further used to cool the piston heads. The inserts have been developed as a means to prevent fatigue of piston heads caused by heat and mechanical stress which tends to cause the piston heads to fail in the area over the wrist pins.

The piston inserts of the present invention include means which define a hollow annular cavity or gallery and an annular ring. The means which define the hollow annular cavity or gallery is an annular-shaped structure which has an annular-shaped passageway formed therein. The hollow annular cavity or gallery can have a rectangular cross-sectional shape, a circular cross-sectional shape, a polygonal cross-sectional shape, or any other convenient cross-sectional shape.

The annular ring extends radially outward from the means which defines the hollow annular cavity or gallery. The annular ring has a generally rectangular cross-sectional shape with an annular ring groove formed therein. According to one embodiment, the means which defines the hollow annular cavity or gallery and the annular ring are integrated together to form a unitary structure.

The piston inserts used in the present invention can be made from materials which provide mechanical strength and have good thermal conductive properties. According to one embodiment of the present invention, the piston inserts are manufactured by a sintering process such as powder metallurgy, which produces an integral of unitary structure or a two-piece structure which is thereafter formed into an integral structure. A material which was determined to be particularly useful for purposes of the present invention is iron or an iron alloy sintered with copper.

In a preferred embodiment, the piston inserts are designed to be positioned in a piston casting mold in which the piston is cast in a head-up manner.

Figure 1:
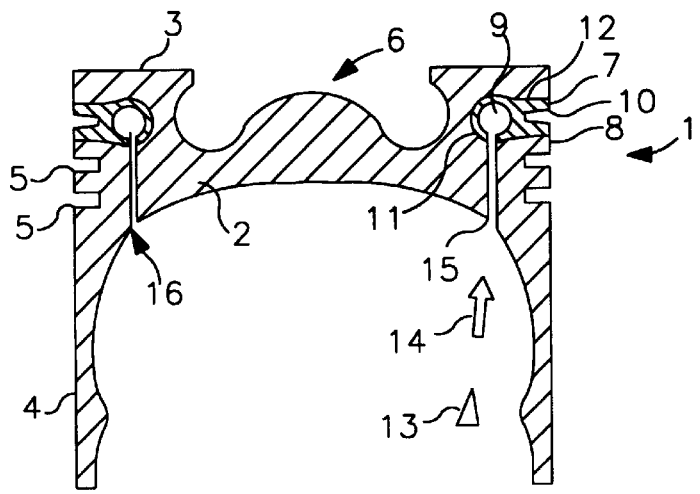
FIG. 1 is a longitudinal sectional view of a cast piston according to one embodiment of the present invention.

FIG. 1 is a longitudinal sectional view of a cast piston according to one embodiment of the present invention. The piston, generally identified by reference numeral 1 includes a head 2 having a crown 3, and a piston skirt 4 extending from the head 2. The piston head 2 includes one or more grooves 5 formed therein which are of conventional design and are provided to receive piston rings (not shown). A combustion bowl 6 is formed in the piston head 2 and extends downwardly from the crown 3. Piston insert 7 is embedded in the piston head 2 below the crown 3 and extends to the periphery surface 8 of the piston head 2. As shown, piston insert 7 defines both a hollow annular cavity or gallery 9 and includes an annular ring groove 10.

The hollow annular cavity or gallery 9 is defined by a base portion 11 of the piston 7 insert which has an annular-shaped passageway 9 formed therein. The annular-shaped passageway 9 can have a circular cross-sectional shape as depicted or any convenient cross-sectional shape such as square, rectangular, triangular, ovular, polygonal, etc. The cross-sectional shape of the annular-shaped passageway 9 can be the same or different from the cross-sectional shape of the means which defines the hollow annular cavity or gallery, i.e, the base portion 11 of the insert. For example, the base portion 11 of the insert can have a square or rectangular cross-sectional shape and the annular-shaped passageway 9 can have a circular cross-sectional shape.

The annular ring 12 which extends from the base portion 11 of the piston insert 7 includes an annular ring groove 10 which defines the top ring groove in the head 2 of the piston 1.

The hollow annular cavity or gallery 9 is designed to receive a flow of cooling oil therein. Accordingly, the lower portion of the piston cylinder (not shown) is provided with one or more oil injectors 13 which direct a jet of oil 14 through a bored inlet channel 15 which communicates with the interior of the hollow annular cavity or gallery 9. Oil entering and passing through the hollow annular cavity of gallery 9 is allowed to exit through a drain channel 16. In practice, one oil injector 13, one inlet channel 15 and one drain channel 16 can be used to provide a sufficient flow of cooling oil. Alternatively, a plurality of oil injectors 13 and inlet channels 15 and drain channels 16 can be included.

Figure 3:
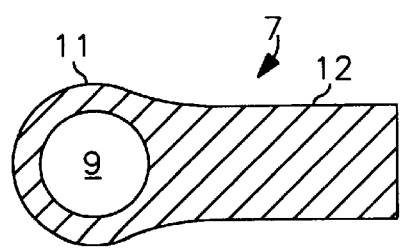
FIG. 3 is a sectional view of the piston insert of FIG. 2, taken along line III—III.
Figure 2:
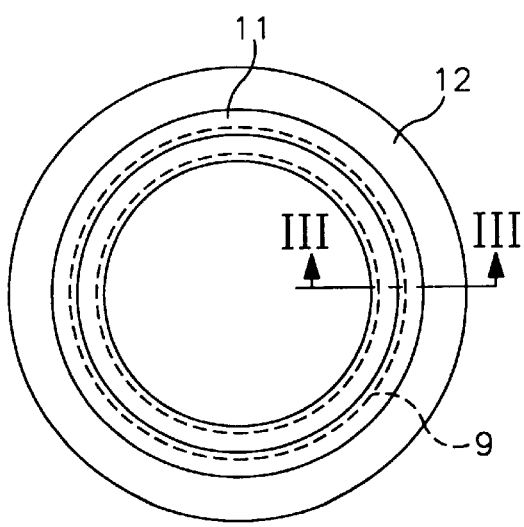
FIG. 2 is a top view of a piston insert according to one embodiment of the present invention.

FIG. 2 is a top view of a piston insert according to one embodiment of the present invention. FIG. 3 is a sectional view of the piston insert of FIG. 2, taken along line III—III. The piston insert depicted in FIGS. 2 and 3 includes a base portion 11 which has a circular cross-sectional shape and an annular ring 12 that has a rectangular cross-sectional shape. The annular-shaped passageway 9 formed in the base portion II (in broken lines) has a circular cross-sectional shape.

The piston insert depicted in FIGS. 2 and 3 does not have the annular ring groove provided in the portion thereof which extends radially outward from the base portion. In this regard, the depicted insert illustrates how the insert is shaped as it is manufactured by a casting or sintering process such as powder metallurgy. The annular groove is machined into the annular ring of the piston inserts after they are formed, either before or after they are cast into a piston. Likewise the ports for the cooling oil inlet and drain channels are not provided in the insert until after the inserts are cast into a piston. Once cast into a piston and machined as necessary, the cooling oil channel(s) and drain channel(s) are bored through the bottom of the piston head and into the interior space of the annular cavity or gallery.

Figure 4:
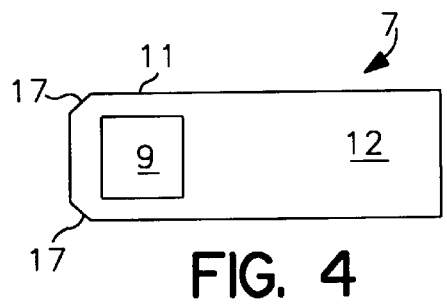
FIG. 4 is a sectional view of an alternative piston insert according to the present invention.

FIG. 1 is a sectional view of an alternative piston insert according to the present invention. The insert depicted in FIG. 4 has an overall rectangular cross-sectional shape with a hollow cavity or gallery 9 that has a square cross-sectional shape. It is noted that the inner edges 17 of the piston insert 7 which corresponds to the base portion 11 in FIG. 4 are beveled as depicted or otherwise curved. The use of smooth transitional surface shapes, e.g. bevels, curves, etc. ensure that molten metal, such as aluminum, fully encompasses and surrounds the insert during a casting process so that there are substantially no gaps between the insert and the cast piston head.

Figure 5:
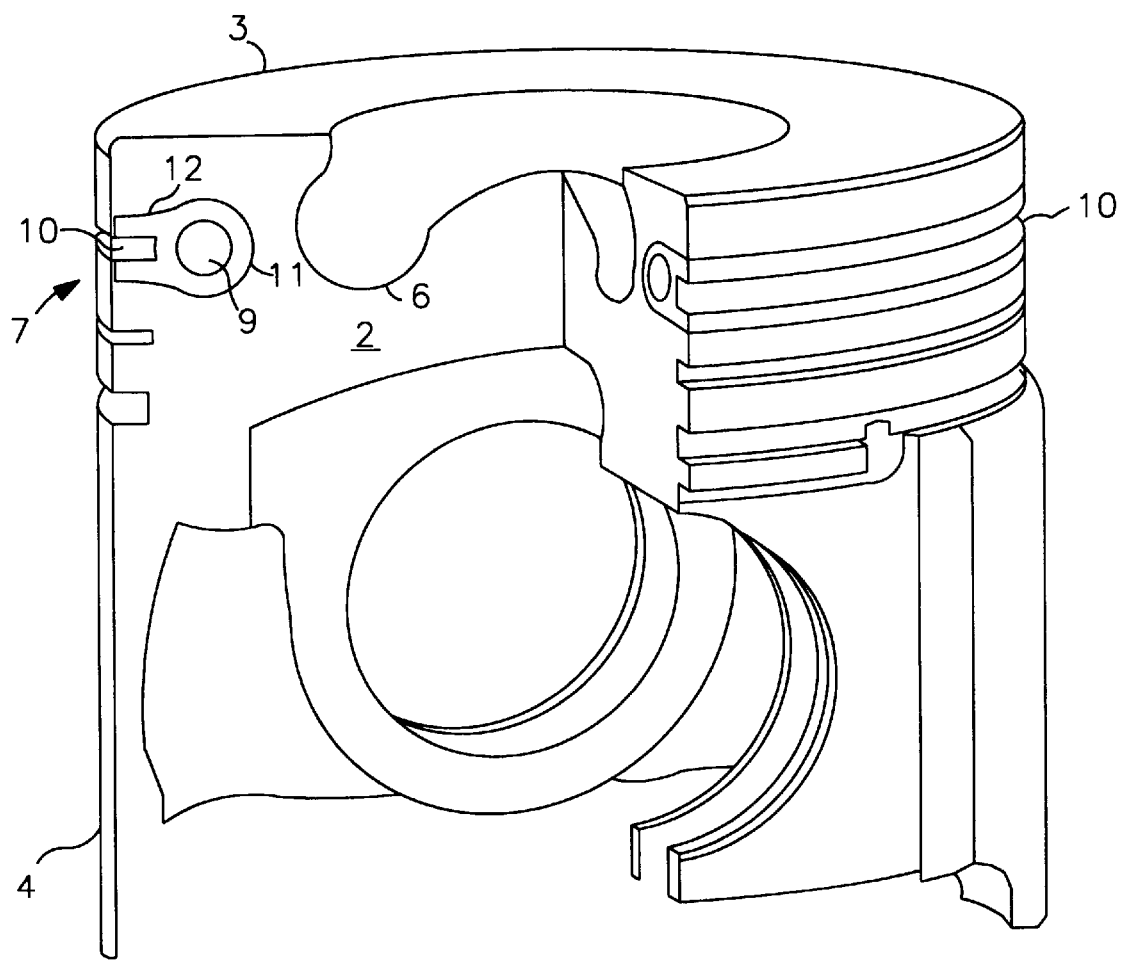
FIG. 5 is a fragmented three-dimensional computer drawing of a piston having the insert of the present invention embedded therein.

FIG. 5 is a fragmented three-dimensional computer drawing of a piston having the insert of the present invention embedded therein. FIG. 5 depicts the position of the insert 7 relative to the crown 3 of the piston and the combustion bowl 6 according to one embodiment of the present invention.

As discussed above, a piston having the present piston insert embedded therein is cast in a mold in a head-up manner. Prior to casting such a piston, the piston insert is positioned in a piston casting mold and held in place along the outermost radial edge by support fingers. Next, the mold is filled with molten aluminum or an alloy thereof so as to cast a piston having the insert embedded therein with the annular ring positioned at the peripheral surface thereof. After molding, the cast piston is machined, the annular ring groove is machined or finished, and the cooling oil inlet channel(s) and drain channel(s) are bored though the bottom of the piston.

The piston can be either gravity cast or produced by a pressure or squeeze casting process. The piston insert of the present invention functions both to strengthen the crown of the piston and provide a means for internally cooling the head of the piston. Thus, the piston insert of the present invention resists mechanical stresses and relieves adverse thermal effects.

The use of the piston insert of the present invention will extend the service life of cast pistons and reduce stress at the edges of the combustion bowl of a piston. The insert avoids prior salt core technologies which were previously used to form internal cavities in cast pistons. It has been determined that the insert of the present invention allows the entire combustion bowl area of a piston to be effectively cooled with the use of a single oil injector.

Although the present invention has been described with reference to particular means, materials and embodiments, from the foregoing description, one skilled in the art can easily ascertain the essential characteristics of the present invention and various changes and modifications may be made to adapt the various uses and characteristics without departing from the spirit and scope of the present invention as set forth in the appended claims.

What is claimed is:

1. A cast piston which comprises:
    a piston head having an upper crown surface and a peripheral side surface;
    a piston skirt extending downward from the piston head; and
    an annular metal insert provided in the piston head below the upper crown surface and intersecting the peripheral side surface,
    the annular metal insert comprising a base and an annular ring that are integrated together to form a unitary structure made from a continuous material and having a cross-sectional shape extending from the base and around the annular ring which has a smooth transitional shape, the base having an annular shaped passageway therein, and the annular ring extending radially outward from the base.

2. A cast piston according to claim 1, wherein the piston includes a piston ring groove which is formed in the annular ring.

3. A cast piston according to claim 1, further including at least one channel which communicates between an interior of the annular passageway and a bottom portion of the piston head.

4. A cast piston according to claim 3, wherein the at least one channel comprises an inlet channel into which a cooling fluid can be directed and an outlet channel through which fluid in the annular passageway can be drained.

5. A cast piston according to claim 1, wherein the base and the annular ring each have an approximately equal thickness.

6. A cast piston according to claim 5, wherein the annular passageway has a rectangular cross-sectional shape.

7. A cast piston according to claim 1, wherein the annular passageway has a circular cross-sectional shape.

8. A cast piston according to claim 7 wherein the base has a thickness which is greater than a thickness of the annular ring.

9. A cast piston according to claim 1, further including a combustion bowl formed in the crown surface of the piston.

10. A cast piston according to claim 1, wherein the annular metal insert in formed by a powder metallurgy process.

11. A cast piston which comprises:
    a piston head having an upper crown surface and a peripheral side surface;
    a piston skirt extending downward from the piston head; and
    an annular metal insert provided in the piston head below the upper crown surface and intersecting the peripheral side surface, the annular metal insert comprising:
    a base having an annular cavity defined therein, and
    an annular ring extending radially outward from the base,
    the annular metal insert being a unitary structure made from a continuous material and having a cross-sectional shape extending from the base and around the annular ring which has a smooth transitional shape.

12. A cast piston according to claim 11, wherein the base and the annular ring together comprise an integrated, unitary structure.

13. A cast piston according to claim 11, wherein the piston includes a piston ring groove which is formed in the annular ring.

14. A cast piston according to claim 11, further including at Least one channel which communicates between the interior of the annular cavity and a bottom portion of the piston head.

15. A cast piston according to claim 14, wherein the at least one channel comprises an inlet channel into which a cooling fluid can be directed and an outlet channel through which fluid in the annular cavity can be drained.

16. A cast piston according to claim 11, wherein the base and the annular ring each have an approximately equal thickness.

17. A cast piston according to claim 11, wherein the base has a thickness which is greater than a thickness of the annular ring.

18. A method of fabricating a cast piston which comprises:
    providing a piston mold;
    positioning a metal insert in the piston mold, the metal inset having a base containing an annular cavity and an annular ring extending radially outward from the base, the metal insert being a unitary structure made from a continuous material and having a cross-sectional shape extending from the base and around the annular ring which has a smooth transitional shape;
    casting a piston in the piston mold so that the metal insert is located beneath a crown surface of the cast piston;
    machining a piston ring groove in a portion of the metal insert; and
    boring at least one channel in the cast piston which communicates at least on channel between the annular cavity of the metal insert and a bottom portion of the cast piston.

19. A method according to claim 18, wherein the piston is cast using a gravity casting process.

20. A method according to claim 18, wherein the piston is cast using a squeeze casting process.

21. A method according to claim 18, further comprising forming a combustion bowl in the crown surface of the piston.

22. A case piston according to claim 1, wherein the cross-sectional shape of the annular metal insert is free from projections.

23. A case piston according to claim 11, wherein the cross-sectional shape of the annular metal insert is free from projections.

24. A method of fabricating a case piston according to claim 18, wherein the cross-sectional shape of the metal insert is free from projections.

* * * * *